(12) United States Patent
Popp et al.

(10) Patent No.: US 12,527,664 B2
(45) Date of Patent: Jan. 20, 2026

(54) ANCHORING METHOD FOR REDUCING CARDIAC VALVE REGURGITATION

(71) Applicant: Edwards Lifesciences Corporation, Irvine, CA (US)

(72) Inventors: Michael J. Popp, Irvine, CA (US); Roseminda J. White, Temecula, CA (US); Maria L. Saravia, Irvine, CA (US)

(73) Assignee: Edwards Lifesciences Corporation, Irvine, CA (US)

( * ) Notice: Subject to any disclaimer, the term of this patent is extended or adjusted under 35 U.S.C. 154(b) by 1186 days.

(21) Appl. No.: 17/408,722

(22) Filed: Aug. 23, 2021

(65) Prior Publication Data

US 2021/0378824 A1  Dec. 9, 2021

Related U.S. Application Data

(63) Continuation of application No. PCT/US2020/016730, filed on Feb. 5, 2020.

(60) Provisional application No. 62/810,124, filed on Feb. 25, 2019.

(51) Int. Cl.
*A61F 2/24* (2006.01)

(52) U.S. Cl.
CPC .......... *A61F 2/2466* (2013.01); *A61F 2/246* (2013.01); *A61F 2210/0014* (2013.01); *A61F 2230/0086* (2013.01)

(58) Field of Classification Search
CPC .............. A61F 2/2466; A61F 2/246; A61F 2210/0014; A61F 2230/0086; A61F 2/2487; A61B 17/00234; A61B 2017/00243; A61B 2017/00477; A61B 2017/00867; A61B 2017/00871; A61B 2017/0417; A61B 2017/0419; A61B 2017/0438; A61B 2017/0464; A61B 2017/048; A61B 17/0401
See application file for complete search history.

(56) References Cited

U.S. PATENT DOCUMENTS

| | | | |
|---|---|---|---|
| 5,108,420 | A | 4/1992 | Marks |
| 5,334,217 | A | 8/1994 | Das |
| 5,861,003 | A | 1/1999 | Latson et al. |
| 5,976,174 | A | 11/1999 | Ruiz |
| 6,221,092 | B1 | 4/2001 | Koike et al. |
| 6,551,344 | B2 | 4/2003 | Thill |
| 9,119,607 | B2 | 9/2015 | Amin |
| 9,326,759 | B2 | 5/2016 | Chanduszko et al. |

(Continued)

FOREIGN PATENT DOCUMENTS

| | | |
|---|---|---|
| WO | 2011089459 A1 | 7/2011 |
| WO | 2017087701 A1 | 5/2017 |

*Primary Examiner* — Sarah W Aleman
*Assistant Examiner* — Rachel S Highland
(74) *Attorney, Agent, or Firm* — Richard B. Cates (57) ABSTRACT

An anchor for securing medical devices within a patient and/or sealing an opening in a body structure can be deployed via a catheter. The anchor may include a distal plate, and proximal plate, and a bridge portion connecting the plates. The anchor may include a tensioning member which can pull the plates together in order to secure the anchor in place and/or seal the opening in the body structure. A single anchor can be used, or multiple anchors, to secure tethers and other medical devices within a patient.

33 Claims, 5 Drawing Sheets

(56) References Cited

U.S. PATENT DOCUMENTS

| | | |
|---|---|---|
| 9,808,230 B2 | 11/2017 | Brown et al. |
| 2003/0139819 A1 | 7/2003 | Beer et al. |
| 2005/0075723 A1 | 4/2005 | Schroeder et al. |
| 2016/0045199 A1 | 2/2016 | Mooney |
| 2017/0135817 A1* | 5/2017 | Tylis ............... A61F 2/2445 |
| 2017/0135818 A1 | 5/2017 | Axelrod et al. |
| 2018/0008248 A1* | 1/2018 | Rafiee ............. A61B 17/1215 |
| 2018/0303469 A1 | 10/2018 | Diaz Jimenez et al. |

* cited by examiner

ANCHORING METHOD FOR REDUCING CARDIAC VALVE REGURGITATION

Related Applications

This application is a continuation application of International Patent Application Ser. No. PCT/US2020/016730, filed Feb. 5, 2020 and entitled ANCHORING METHOD FOR REDUCING CARDIAC VALVE REGURGITATION, which claims priority based on U.S. Provisional Patent Application Ser. No. 62/810,124, filed Feb. 25, 2019 and entitled ANCHORING METHOD FOR REDUCING CARDIAC VALVE REGURGITATION the complete disclosures of both of which are hereby incorporated herein in their entireties.

Field of the Invention

The present invention relates to medical devices and methods, and, more particularly, to methods and apparatuses for anchoring in and sealing body structures.

BACKGROUND OF THE INVENTION

A healthy left ventricle of a human heart, which is the primary pumping chamber, is generally conical or apical in shape in that it is longer (along a longitudinal axis extending in a direction from the aortic valve to the apex) than it is wide (along a transverse axis extending between opposing walls at the widest point of the left ventricle) and descends from a base with a decreasing cross-sectional circumference to a point or apex. The pumping of blood from the left ventricle is accomplished by a squeezing motion and a twisting or torsional motion. Chronic congestive heart failure and other disease processes can cause the heart to enlarge or dilate from a conical shape to a shorter and wider shape, which in turn causes the muscle fibers to become reoriented. As a result of the dilation, the pumping efficiency of the left ventricle is reduced. In a similar manner, dilation of the heart also can adversely affect the function of the right ventricle.

Mitral valve incompetency or mitral valve regurgitation is a common comorbidity of congestive heart failure. As the dilation of the ventricle increases, valve function generally worsens, which results in a volume overload condition. The volume overload condition further increases ventricular wall stress, thereby advancing the dilation process, which further worsens valve dysfunction.

A variety of procedures have been proposed for treating ventricular dilatation and/or reshaping various body structures, such as a ventricle and/or valve annulus, using tethers and anchors. A heart with even a small amount of regurgitation may benefit from not only the stress reducing functions of the ventricular splints/tethers, but also from an elimination of the regurgitation, which will further off-load pumping requirements of the myocardium.

Key elements of splinting and tethering systems are the anchors which secure tethers and/or splints to body structure, such as a heart wall. Various anchor structures have been proposed. The functionality of such anchors, including holding power, can vary depending on the anchor characteristics as well as the deployment positioning and use, etc. Surface area of an anchor and/or size of the anchor can correspond to the ability of an anchor to withstand forces due to tension from reshaping the heart and ongoing beating of the heart (although, other design features and material properties may also contribute to the ability of the anchor to withstand tension forces). Accordingly, large anchors, or anchors with a large surface area, may be required, and the larger size/area can make implantation of the anchor difficult and can require opening the heart, chest, and/or sternum, and/or may require other highly invasive procedures.

Devices and methods for medical treatment that may be used for improved anchoring of medical devices in a patient's anatomy, such as devices for repairing heart valve function, are described herein. These may include a self-expandable anchor system and related methods for reshaping body structures and/or repairing body structures and functions, such as assisting in treating an apposition of heart valve leaflets to improve poorly functioning heart valves, using less invasive treatments/procedures.

There is a need for improved repair devices and methods for anchoring in and sealing wall structures. The current invention fulfills this need.

SUMMARY OF THE INVENTION

The present invention provides systems, devices, and methods for anchoring medical devices in a patient's anatomy, including anchoring of tethers/splints for reshaping body structures (such as heart chambers and/or heart valve annuluses) and other medical devices. Anchor devices of the invention may be also, or alternatively, be used to seal holes in body structures, such as in a heart wall to prevent the flow of blood therethrough.

Anchor devices according to embodiments of the invention may have a deployed configuration and a delivery configuration. Such anchor devices may have a distal plate portion formed from a distal frame and a distal covering, with the distal plate portion having an expanded configuration wherein the distal frame forms a substantially flat disk, and a compressed configuration wherein the distal frame forms an elongated shape adapted to be inserted into a sheath of a delivery catheter. The anchor device may have a proximal plate portion formed from a proximal frame and a proximal covering, with the proximal plate portion having an expanded configuration wherein the proximal frame forms a substantially flat disk, and a compressed configuration wherein the proximal frame forms an elongated shape adapted to be inserted into a sheath of a delivery catheter. An elongate bridge portion may extend between and connect the distal plate portion and the proximal plate portion. The bridge portion may have a compressed configuration for delivery via a catheter, and an expanded configuration. The bridge portion may form a substantially tubular covering defining a bridge lumen therethrough. The bridge portion, proximal portion covering, and distal portion covering may be formed as a single continuous piece of material, such as where the portions are cut as a single piece from a piece of cloth, or where the portions are formed from separate pieces of cloth sewn together to form a single continuous piece of material. When the anchor device is in the deployed configuration, the distal plate portion, proximal plate portion, and bridge portion may all be in their respective expanded configurations The distal frame and/or the proximal frame may be formed from a memory material, such as Nitinol. The distal frame and/or proximal frame may in the expanded configuration be ring shaped, such as a circular shaped ring.

The distal frame and/or proximal frame may each have a first end, a second end, and a ring portion extending between the first end and the second end, wherein in the expanded configuration the frame ring portion forms a ring-shaped perimeter. In the expanded configuration of the distal plate portion and/or the proximal plate portion, the first end and the second end may overlap each other or may be adjacent without overlapping. In their respective compressed configurations, the ring forms of the distal frame and/or the proximal frame may form an elongated shape with the first end and the second end on opposing ends of the elongated shape.

The first end and the second end of the proximal frame and/or distal frame may each comprise an atraumatic structure adapted to minimize damage to tissue when the atraumatic structure engages tissue.

The anchor device of claim 1, wherein the proximal frame and the distal frame are each formed from memory material biased toward the expanded configuration. In their expanded configurations, the proximal frame may match the shape and size of the distal frame.

Anchor devices may include coverings, such as coverings of biocompatible cloth. The coverings may be adapted to be secured to the frames. For example, a distal covering may have a distal portion outer channel extending around a perimeter of the distal plate portion, with the distal frame passing through the distal portion outer channel. Similarly, a proximal covering may have a proximal portion outer channel extending around a perimeter of the proximal plate portion, with the proximal frame passing through the proximal portion outer channel.

Anchor devices of the invention may include tensioning elements, such as a tensioning line passing within the anchor device and adapted to selectively draw the first plate portion toward the second plate portion. For example, the distal covering may define a distal portion inner channel extending around the distal covering adjacent the bridge lumen, and the proximal covering may have a proximal portion inner channel extending around the proximal covering adjacent the bridge lumen. The tensioning line may pass through the distal portion inner channel, the proximal portion inner channel, and/or the bridge portion lumen.

The plate portions covering may have a series of wedge-shaped portions, which when a respective plate portion is in the expanded configuration extend inwardly from the plate portions frame. Each wedge-shaped portion may have a loop, and the loops of adjacent wedge-shaped portions may align to form the respective plate portion inner channel.

The tensioning line may be a line of suture. A tensioning line may have a distal end secured to the anchor device, and a proximal portion adapted to be pulled by a user to apply tension to the tensioning line. The tensioning line may extend from the securement point on the anchor device and through one, two, or all three of the proximal plate portion, the bridge portion, and the distal plate portion. In one embodiment, the tensioning line distal end is secured to the proximal plate portion, and then passes through a proximal plate portion inner channel, through the bridge portion (e.g., through a bridge lumen), through a distal plate portion inner channel, and then back through the bridge lumen. The tensioning element may include a line proximal portion which extends out of the patient, which can be pulled by a surgeon or other user to apply tension to the tensioning line.

Systems of the invention may include anchor devices such as described above, and may also include a delivery catheter adapted to hold and deploy such anchor devices. Such delivery catheters may include a catheter distal portion adapted to receive and releasably hold the anchor device in the delivery configuration, which may include a sheath and/or expandable balloon. The delivery catheter may include a catheter proximal portion having a control handle having one or more controls thereon, such as a control for expanding the balloon and a control for slidingly moving an anchor device in and/or out of the sheath (such as via advancing and/or retracting the sheath with respect to the anchor device). The catheter may include an elongated body portion (which may be flexible) extending between the catheter distal portion and the catheter proximal portion.

The expansion balloon may be adapted to radially expand one or more portions of the anchor device.

The anchor device may be secured within the sheath with the distal frame first end distal of the distal frame ring portion, and with the distal frame second end proximal of the distal frame ring portion. The anchor device may be secured within the sheath with the proximal frame first end distal of the proximal frame ring portion, and with the proximal frame second end proximal of the proximal frame ring portion. The anchor device may be secured within the sheath with the distal plate portion distal of the bridge portion, and with the proximal plate portion proximal of the bridge portion. The catheter may be adapted to advance the anchor device out of the sheath with the distal frame first end advancing out of the sheath first, followed by the distal frame second end, followed by the bridge portion, followed by the proximal frame first end, followed by the proximal frame second end.

The positioning and configuration of the anchor device with respect to a delivery catheter can improve the delivery aspects of the device. For example, securing an anchor device with a first frame distal end at the distal-most position with respect to the catheter, followed by the first frame proximal end, then the bridge, then the proximal frame distal end, and then (at the most proximal position) the proximal frame proximal end, can provide for a particularly narrow and flexible device for easy delivery in relatively small diameter catheters. Note that configurations of the frames and covers of the invention can contribute to the improved delivery via narrow diameter catheters. For example, frames having opposing ends (e.g., distal and proximal) which can be separated for positioning in the distal-end-first followed by proximal-end-last configurations for delivery, and then be expanded to their ring-like shapes upon deployment, can be conducive to use with for relatively small diameter delivery catheters, and can also lend themselves to being particularly flexible during delivery. Also, cover configurations which provide for collapse and elongation of the cover (and also of the frames to which the covers are secured) into narrow and elongated shapes for catheter delivery, such as covers having multiple wedge-shaped elements as disclosed herein, can provide improved catheter delivery due to improved flexibility during advancement and also due to their ability to be used particularly narrow diameter catheters.

A system of the invention may include a tensioning line passing through the anchor device and adapted to pull the distal plate portion toward the proximal plate portion, with the tensioning line having a line distal end secured to the anchor device. The tensioning line may further have a proximal line portion extending along the catheter to the control handle, and the proximal line portion may be adapted to be pulled by a user to selectively pull the distal plate portion toward the proximal plate portion. The tensioning line may extend from the line distal end, then through the proximal inner channel, then through the bridge lumen, then through the distal inner channel, then back through the bridge lumen, then along the catheter to the control handle.

Various methods are within the scope of the invention. In one method of securing an anchor device to a tissue structure in a patient, systems of the invention as described above may be provided. The catheter distal end may be advanced with the anchor device secured thereto to a desired treatment site. The anchor device may be deployed at the desired treatment site such that the distal plate portion is in the distal plate expanded configuration and is positioned on a distal side of a body structure, the bridge portion passes through a hole extending through body structure, and the proximal plate portion is in the proximal plate expanded configuration and is positioned on a proximal side of a body structure.

After deployment of the anchor device at the desired treatment site, the body structure may be compressed between the distal plate portion and the proximal plate portion. The hole extending through the body structure may be sealed by the anchor device such that fluid flow through the hole is prevented.

Methods of the invention may include securing a medical implant to the anchor device, such as a tether adapted to modify performance of a body organ. Securing the medical implant to the anchor device may be performed before or after deployment of the anchor device. The medical implant may be adapted to modify performance of a body organ, such as a human heart. Advancing the delivery catheter distal end to the treatment site may involve advancing the delivery catheter distal end through a femoral artery and through an aorta.

Deploying the anchor device at the desired treatment site may include expanding the distal plate portion to the distal plate expanded configuration in a position on the distal side of the body structure, followed by expanding the proximal plate portion to the proximal plate expanded configuration in a position on the proximal side of a body structure.

Where a tensioning line is included in a system of the invention, after expanding the proximal plate portion to the proximal plate expanded configuration in a position on the proximal side of a body structure, tension can be applied to the tensioning line to draw the distal plate portion toward the proximal plate portion, such as to compress the body structure between the plates.

Where the distal frame and the proximal frame are self-expanding, the catheter may further comprise a sheath in which the anchor device is slidingly positioned in the delivery configuration, and deploying the anchor device may involve slidingly advancing the anchor device out of the sheath.

The systems, devices, and/or methods of the present invention can be utilized in various catheter-based procedures, including minimally-invasive procedures and percutaneous procedures. In some embodiments the methods/systems/devices may involve transapical deliveries through a small chest incision. In other embodiment, the methods/systems/devices can be used in transatrial procedures. In yet other embodiments, the methods/systems/devices can be used in percutaneous procedures, such as via a catheter or catheters into the patient's arterial system (e.g., through the femoral or brachial arteries).

It should be understood that each of the elements disclosed herein can be used with any and all of the elements disclosed herein, even though the specific combination of elements may not be explicitly shown in the figures herein. In other words, based on the explanation of the particular device, one of skill in the art should have little trouble combining the features of certain of two such devices. Therefore, it should be understood that many of the elements are interchangeable, and the invention covers all permutations thereof.

Other objects, features, and advantages of the present invention will become apparent from a consideration of the following detailed description.

DETAILED DESCRIPTION OF SEVERAL EMBODIMENTS

Figure 1:
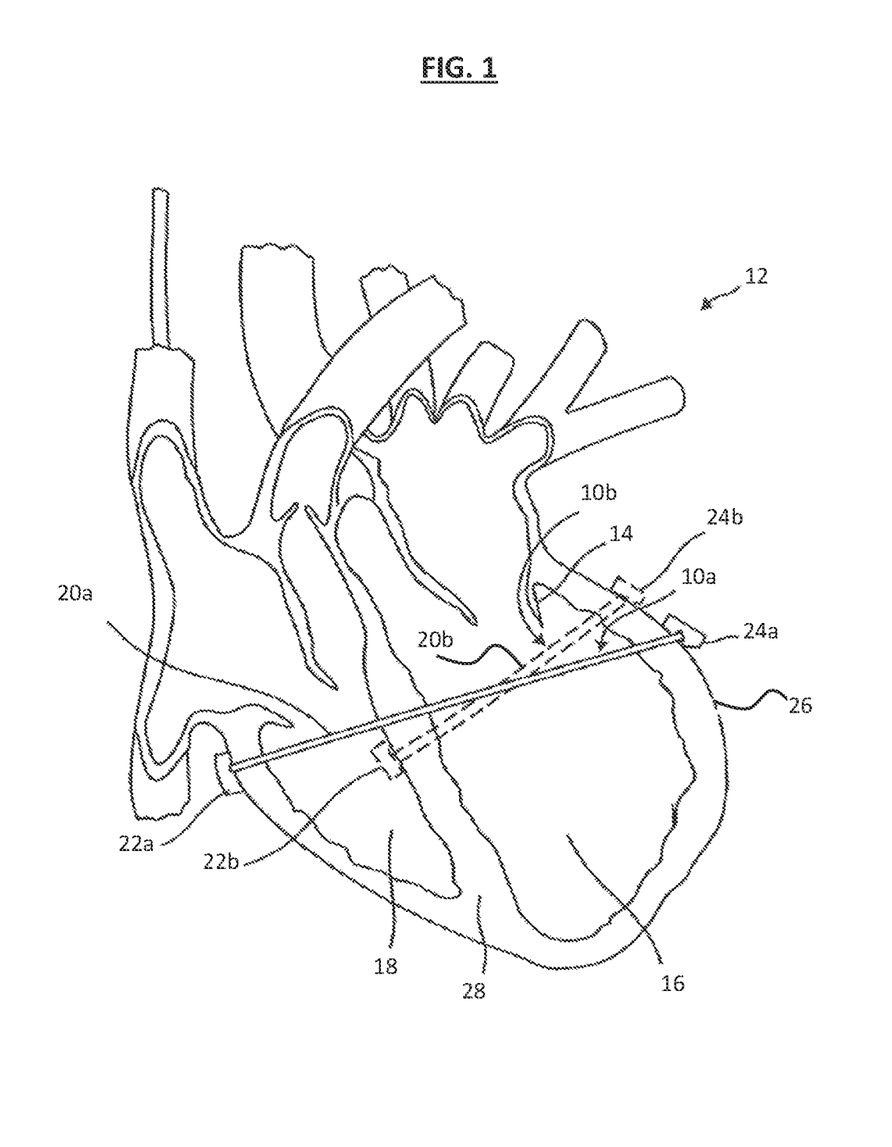
FIG. 1 is a front cross-sectional view of a human heart illustrating orientations of exemplary mitral valve tethers according to an embodiment of the invention.

FIG. 1 illustrate apparatuses 10a, 10b of the invention placed within a human heart 12 at various deployment configurations/positions. Depending on the particular deployment, apparatuses of the invention such as apparatuses 10a, 10b may serve to lessen myocardial muscular stresses and/or treat leaflet apposition of a heart valve, such as a mitral valve 14, as discussed herein. For example, an apparatus 10a, 10b of the invention may be used to reshape the left ventricle 16 and/or right ventricle 18 of the heart 12, depending on the deployment (e.g., orientation) and other characteristics of the apparatus 10a. Apparatus 10b may be similar to apparatus 10a or different in characteristics such as dimensions, deployment positions, etc.

As depicted in FIG. 1, apparatus 10a has a tether 20a connecting anchors 22a, 24a. The anchors 22a, 24a are positioned in opposing side walls 26 of the heart 10. Apparatus 10b has a tether 20b with anchors 22b, 24b, but with anchor 22b in a side wall 26 of the heart 12 and anchor 24b inside the septum 28 of the heart 12.

The exact placement and orientation of apparatuses of the invention may vary, and the placements and orientations shown in FIG. 1 are non-limiting examples. Also, a single apparatus may be used by itself in a heart, or more than one apparatus could be used simultaneously, such as at different locations within the heart for variations on the treatment.

Figure 2A:
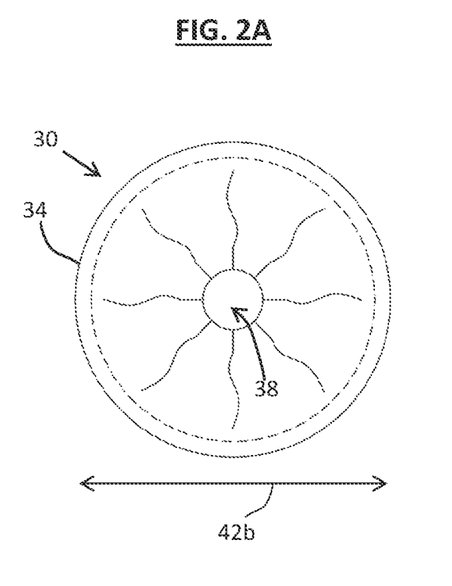
FIGS. 2A-2B depict front and side views of an anchor according to an embodiment of the invention.
Figure 2B:
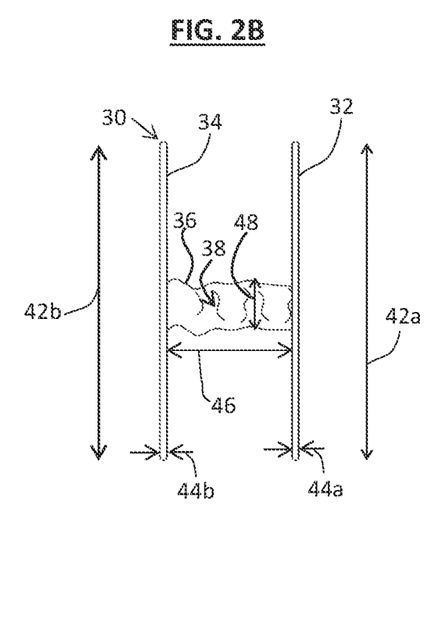

An exemplary anchor 30 of the invention is depicted in FIGS. 2A-2C, with the anchor 30 having a distal plate 32 and a proximal plate 34, with a bridge 36 connecting the plates 32, 34. The bridge 36 may define a bridge lumen 38 passing therethrough. The dimensions of anchors according to embodiments of the invention may vary depending on the particular application. For example, distal and proximal plates 32, 34 may have deployed diameters 42a, 42b between 0.8 and 1.4 cm, 1 and 1.25 cm, or about 1.13 cm, thus providing anchor tissue-engaging surface areas of between 2 and 6 cm$^2$, between 3 and 5 cm$^2$, or of 4 cm$^2$. The distal and proximal plates of a particular anchor may have equal diameters, or may be of different sizes. For example, one plate may be larger in diameter than the other by 5-10%, 10-15%, 15-20%, 20-25%, or more than 25%, such as where one plate is deployed on the exterior surface of a body structure and the other plate is deployed on the interior surface. The plates may preferably have minimal thicknesses, such as thicknesses 44a, 44b between 0.2 and 2 mm. A bridge may have a deployed length which matches or approximates the thickness of the body structure in which the anchor is deployed. The bridge deployed diameter may be small or relatively large, such as where the bridge is used to seal an opening in the body structure. Note that bridge lengths and diameters of the invention are variable depending on the particular anatomical structures involved, as well as the size of the puncture/delivery hole made by the delivery apparatuses. For example, a bridge which passes through the myocardium and also through the pericardium will be much longer that a bridge which passes only through the myocardium. Examples of bridge deployed lengths 46 are between 1 mm and 2 cm. For myocardial applications, the bridge deployed length may be from 2 to 10 mm, or from 4 to 8 mm. Bridge deployed diameters 48 may be between 1 mm and 10 mm. Note the bridge lengths and diameters of the invention are not limited to these particular values, and may be smaller or larger than these values/ranges.

Figure 3:
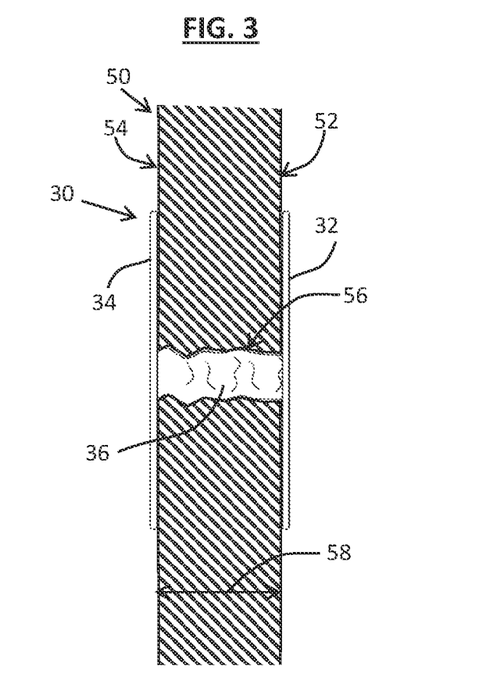
FIG. 3 depicts a side view of an anchor deployed in a heart wall according to an embodiment of the invention.

As depicted in FIG. 3, the anchor 30 can be deployed within a body structure 50 (such as a heart wall), with the distal plate 32 positioned on a first side 52 of the body structure 50 and the proximal plate 34 positioned on a second side 54 of the body structure 50, and with the bridge 36 passing through an opening 56 in the body structure 50. The opening 56 and bridge 36 extend through the thickness 58 of the body structure 50.

Anchors such as those disclosed herein may be used in dual- or other multi-anchor apparatuses, such as the tethering systems depicted in FIG. 1. Examples of such apparatuses, and their uses/methods/systems, are depicted and described in U.S. Pat. No. 7,766,812 to Schroder et al. and U.S. Patent Publication No. 2017/0135817 to Tylis et al., the entire contents of each of which are hereby incorporated by reference. Such anchors can also be used in single anchor assemblies, including where a single anchor is used to secure a first end of a tether to a body structure, but with the other end of the tether secured to a non-anchor element positioned within a patient's anatomy. Examples of such apparatuses, and their uses/methods/systems, are depicted and described in U.S. Pat. No. 8,029,556 to Rowe.

Anchors of the invention may have frames to hold their desired deployed shapes. Such frames may have a delivery configuration (which may be elongated but narrow, such as where an anchor is delivered from a catheter), and may be expandable (e.g., via balloon and/or via self-expansion) to the deployed configuration.

An example of an anchor frame 60, which may be incorporated into an anchor of the invention. The anchor frame 60 may be self-expanding to the desired deployment shape, which may be the circular shape depicted. The anchor frame 60 comprises a ring 62 having ends 64 which meet at a break 66. As will be appreciated, the break 66 facilitates expanding/reshaping the anchor frame 60 into a low-profile configuration and/or straightened configuration suitable for loading the frame 60 into the lumen of a delivery catheter. The ring 62 may comprise or consist of a shape memory material (e.g., nitinol or another shape memory alloy) suitable for returning the frame 60 from the low-profile con-figuration (e.g., straightened configuration) to the circular configuration shown in FIGS. 4A-4C. It is contemplated, however, that various other suitably shape memory or elastic materials may be used for the ring 62 without limitation, and without deviating beyond the spirit and scope of the present disclosure. In one embodiment, the frame 60 may be formed of stainless steel. Frame 60 may be of different sizes, diameters, and shapes. Similarly, the ring 62 may be of different sizes, diameters, and shapes, including in the cross-sectional size/shape of the ring 62. Optionally, the ring 62 in cross-section may be circular, oval, ovoid, flower shaped, star shaped, square, rectangular, pentagonal, hexagonal, decagonal, spiral, helical, and/or other shapes. Also, while frame 60 is shown having a circular ring-like shape, other cross-sectional shapes are possible, e.g., oval, ovoid, triangular, square, rectangular, pentagonal, hexagonal, decagonal, etc.

The atraumatic ends 64 prevent the ends of the frame 60 from otherwise damaging the delivery catheter or the tissues of the heart or other body structures during delivery and deployment of the anchor. Further, the atraumatic ends 64 may facilitate loading of the anchor into/onto a delivery catheter. In the particular embodiment depicted in FIGS. 4A-4C, the atraumatic ends 64 comprise spherical portions or balls at the ends of the ring 62. In one embodiment, the atraumatic ends 64 may be comprised of any of various other suitably shaped portions as may be deemed appropriate; for example, other shapes/configurations for the atraumatic ends 64 is also possible, e.g., cube-shaped, ovoid shaped, oval shaped, etc. In one embodiment, the atraumatic ends 64 comprise portions of the ends of the ring 62 that are formed into spherical, generally spherical, ellipsoid, and/or ovoid portions. In one embodiment, the atraumatic ends 64 may be comprised of separate components that are fastened onto the ends of the ring 62. As will be appreciated, any of various techniques may be used to fasten the atraumatic ends 64 onto the ends of the ring 62 without limitation, including where the atraumatic ends 64 are formed as a single unitary structure (e.g., molded as a single piece) with the ring 62 to create the frame 60. Note that one or both ends of a frame may incorporate such atraumatic structures, and the atraumatic structures may be different at each end of the same frame. For example, the distal end as deployed from a delivery catheter may have one type of atraumatic end structure, and the proximal end as deployed from a delivery catheter may have a different kind of end structure.

Frames of the invention may be formed using various techniques. For example, frames may be formed from wires bent or otherwise formed into a desired shape, or created using molding techniques. Frames may also be cut from tubes, such as metal tubes (e.g., stainless steel or nitinol tubes). Memory materials may be biased toward a desired expanded/deployed shape using known techniques.

Figure 4A:
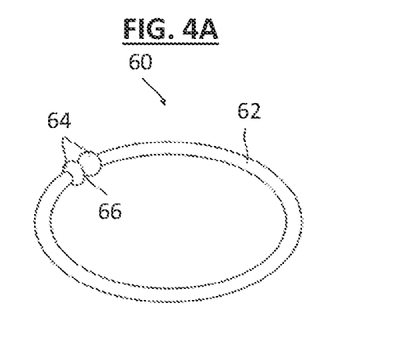
FIGS. 4A-4C depict perspective, side, and end views of an anchor frame according to an embodiment of the invention.
Figure 4B:
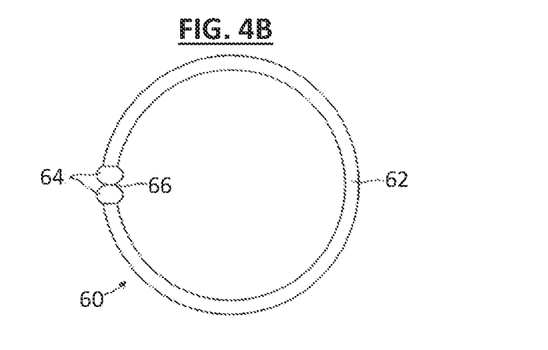
Figure 4C:
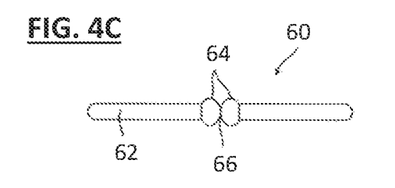
Figure 4D:
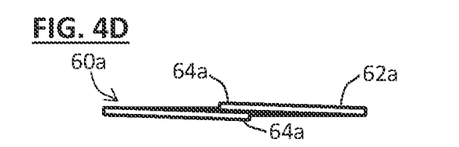
FIG. 4D depicts a side view of an anchor frame according to an embodiment of the invention.
Figure 4E:
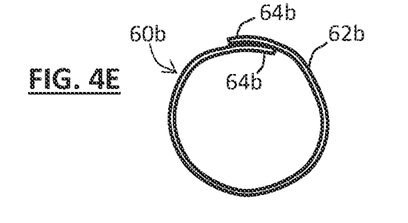
FIG. 4E depicts an end view of an anchor frame according to an embodiment of the invention.

Ends may overlap, as depicted in FIGS. 4D-4E, which may improve the strength of the frame and/or improve the holding power of an anchor which incorporates the frame. For example, as shown in FIG. 4D, ends 64a of a frame 60a may overlap each other, with the ends 64a stacked upon each other in a direction perpendicular to the plane roughly defined by the frame 64a. Similarly, as depicted in FIG. 4E, ends 64b of a frame 60b may overlap each other, with the ends 64b displaced radially inward and outward so as to overlap each other while still remaining in the plane defined by the frame 64b. In the overlapping embodiments, it may be preferable for the overlapping ends to tightly overlap, with minimal or no spacing between the overlapping ends. The amount over overlap depends on the particular application. The overlapping portion may account for a substantial portion of the perimeter of the frame. The overlapping portion may account for 5% or more, 15% or more, 25% or more, 5-30%, or 10-25% of the perimeter of the frame. One (e.g., the distal end as deployed from a delivery catheter) or both of the overlapping ends may have atraumatic structures, such as the atraumatic ends discussed and depicted with respect to FIGS. 4A-4C above. Also, the atraumatic structures of the frame may be the same, or may be different from one end to the other. It is also contemplated that a frame can form a continuous uninterrupted loop, such as where the ends are firmly connected together (e.g., via welding, glue, etc.) or where the frame is formed as a unitary body. Such an uninterrupted loop embodiment would require somewhat different delivery options, such as where the loop is folded/elongated for positioning into the distal end of a catheter for delivery, and for deployment is pushed out of the catheter or otherwise released, at which point the loop would spring into its more circular deployed form.

Figure 5A:
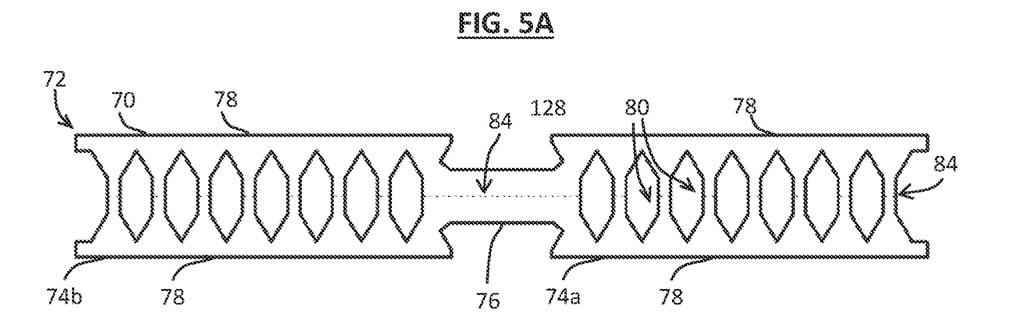
FIG. 5A depicts a plan view of an anchor covering pattern according to an embodiment of the invention.
Figure 5B:
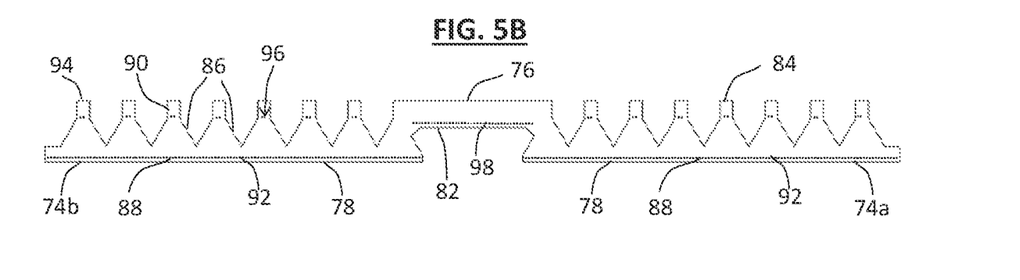
FIG. 5B depicts a plan view of the anchor covering pattern of FIG. 5A in a folded configuration according to an embodiment of the invention.

FIGS. 5A-5B depict a strip 70 which can form a cover 72 which may be incorporated with a frame such as the frame 60 in FIGS. 4A-4C to form an anchor according to an embodiment of the invention. FIG. 5A illustrates the strip 70 in an open, unfolded configuration. The strip 70 has two plate sections 74a, 74b connected by a bridge section 76. Each plate section 74a, 74b has opposing straight edges 78 and a series of cutouts 80. The bridge section has opposing straight edges 82. The particular strip 70 depicted is symmetrical about its midline 84.

As shown in FIG. 5B, the strip 70 can be folded over its midline 84 to form a series of triangular or wedge-shaped portions 86 that work together to fill the center of the anchor, e.g., in pie-shaped slices, when the cover 72 is secured to a frame. The triangular or wedge-shaped portions 86 can help prevent excessive material in the center of the anchor and, thus, help prevent excessive folding or bunching of the material when in the anchor's fully deployed configuration. This may also help the anchor and cover assume a more flattened configuration. Other shapes and designs for the cover are also possible. For example, the cover may have a larger, unbroken surface area (e.g., cover 72 may not have as many tabs, triangular or wedge-shaped portions, or spaces as the embodiment depicted). The strip 70 may be constructed of a thick material or a thin material, and may be configured to form a cover 72 which fills all or a portion of the center of the anchor. The material comprising the strip 70 may be formed of one or more of any of various polymer materials, such as polyethylene terephthalate (PET), ultra-high-molecular-weight polyethylene (UHMWPE), and/or other similar material. In one embodiment, the strip 70 may comprise one or more of any of a wide variety of suitable metallic materials. In one embodiment, the strip 70 may comprise a non-metallic material, such as by way of non-limiting example, carbon fibers and the like. Various combinations of the above materials may also be used.

As illustrated in FIGS. 5B, portions of the strip 70 may be folded and secured such that passages 88 and/or loops 90 are formed through which a frame (such as that depicted in FIGS. 4A-4C) or a tension member may be threaded to form the anchor. For example, the opposing straight edges 78 of the plate sections 74a, 74b may be folded onto (e.g., to overlap) each other, with the opposing and now overlapping straight edges 78 secured to each (e.g., via sewing, adhesive, etc.) to form a passage 88 extending along the length of the overlapping straight edge 78. The passage 88 can accommodate a frame such as that depicted in FIGS. 4A-4C. The passage 88 is defined at its outer edge by the border of the overlapped straight edges (e.g., by the line defined by the sewing or adhesive or other securement which holds the overlapped straight edges together). The passage 88 may be defined at its inner edge by a second line of thread 92 sewn through the overlapped strip 70 (or a line of adhesive along the strip, etc.). Similarly, on the opposing side 94 (i.e., the side with the wedge-shaped portions 86) are a plurality of loops 90 positioned at the ends of the wedge-shaped portions. The loops 90 may be adapted to receive a tensioning member, such as one or more lines of suture, therethrough. The loops 90 may be defined at one end by the fold along the strip midline 84, and at the other end by lines of thread 96 sewn through the strip 70 (or a line of adhesive along the strip, etc.) but spaced slightly away from the fold along the strip midline 84

When the strip 70 is in the folded shape of FIG. 5B, one or more lines of thread 98 (or adhesive, etc.) may be sewn or otherwise applied to the bridge section 76 along the overlapping straight edges 82 of the bridge section 76 in order to form a continuous passage which will define the bridge of the anchor.

The passage 88 is adapted to receive a frame, and the loops 90 are adapted to receive one or more tension members (e.g., one or more lines of suture). Optionally, a similar cover, similar strips, or portions/segments of a cover could be formed from double-lumen cloth (e.g., that may come with a small lumen/passage on one end and a larger lumen/passage on the other end), or from tube-shaped cloth. If tube-shaped cloth is used, it could be flattened with sutures but leave lumens/passages on the ends and could result in the same or a similar shape.

Figure 6A:
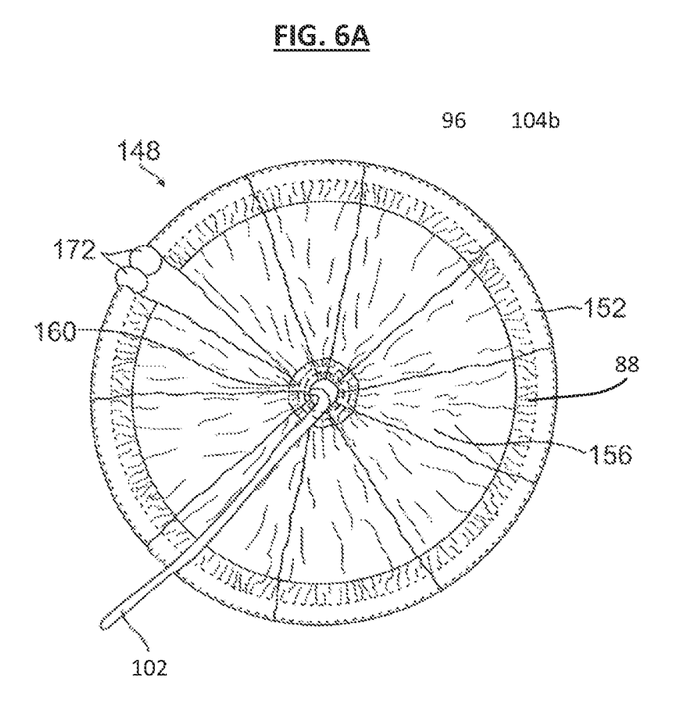
FIGS. 6A-6B depict front and perspective views of an anchor according to an embodiment of the invention.
Figure 6B:
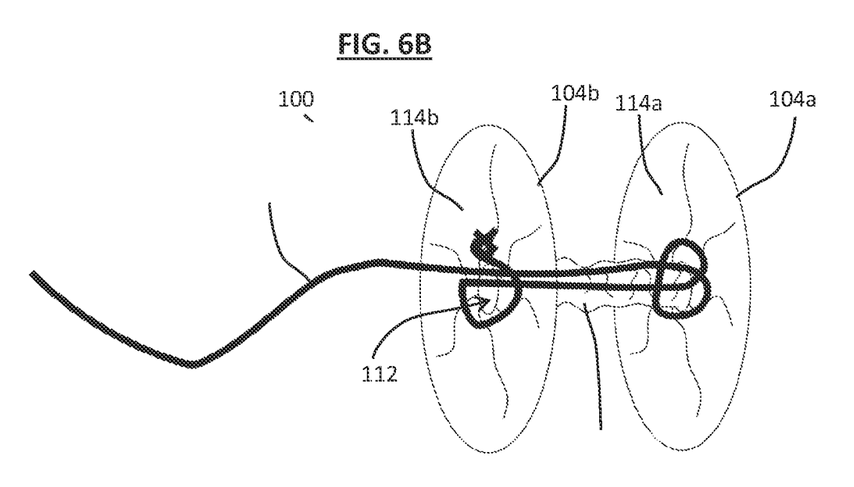

The self-expandable anchor 100 may be formed by mounting the cover 72 onto the frame 60 by way of threading the frames 60 through each of the passages 88, and by threading or weaving the tension member 102 through one or more or all of the loops 90 of each frame 60 and also through the bridge 106 (such as through the bridge lumen 112). The tension member 102 may optionally be tied to itself in a slip knot or similar adjustable knot that allows the tension member to cinch the loops 90 toward the center of each frame 60. Optionally, as depicted in FIG. 6B, a distal end 108 of the tensioning member 102 is secured to a proximal cover portion 114b, passes through the corresponding loops 90 of that proximal cover portion 114b, then passes through the bridge lumen 112, through the corresponding loops 90 of the distal cover portion 114a, and back out through the bridge lumen 112 such that a proximal end 110 of the tensioning element 102 is at a position proximal of proximal cover portion 114b. For example, after passing through the loops 90 and bridge lumen 112, the proximal end of the tension member 102 may extend to a proximal end of a delivery catheter so that pulling at the proximal end 110 may cinch the loops 90 toward the center of each plate portion 104a, 104b (and also to the center of each cover portion 114a, 114b). Pulling on the tensioning member 102 will also draw the plate portions 104a, 104b together, thus compressing the plate portions 104a, 104b against any intervening tissue structures (such as a heart wall).

As will be appreciated, upon loosening the tension member 102 within the loops 90, the frames 60 may be more easily transitioned from a deployed or expanded configuration (e.g., a circular or ring-shaped configuration) into a low profile configuration (e.g., straightened configuration), as discussed above, and thus enables the anchor 100 to be suitably loaded into the lumen of (or otherwise secured to) a delivery catheter.

It should be recognized that anchors according to the invention need not be limited to the frames and covers of FIGS. 4A-6B, but rather various other configurations of anchors are contemplated within the scope and spirit of the present disclosure.

Figure 7:
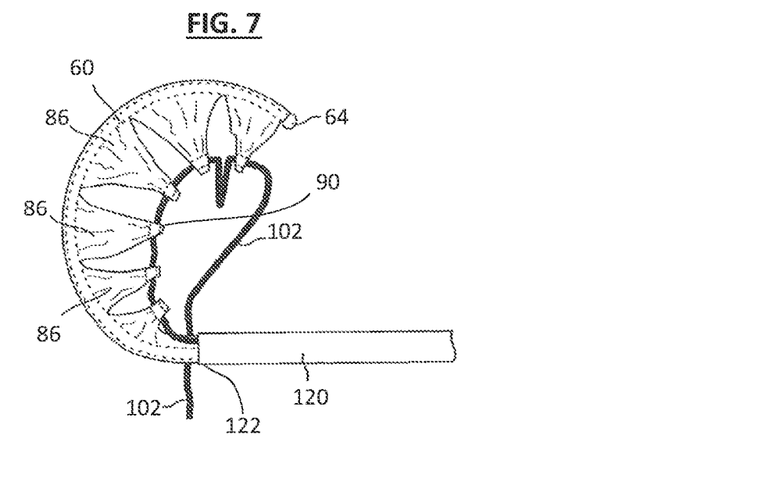
FIG. 7 is a front view of a device being released from a catheter according to an embodiment of the invention.

FIG. 7 depicts a system 120 of the invention having an anchor 100 secured to a catheter 122. An anchor plate portion 104 of the anchor 100 is being deployed from a delivery catheter 122. In the particular embodiment depicted, the anchor plate portion 104 was stored in the catheter 122 in a delivery configuration, which may be an elongated/straightened configuration. A first atraumatic end 64 is advanced out of the catheter distal end 124. As the rest of the anchor portion 104 is advanced out of the catheter 122, the frame 60 transitions its deployed (e.g., circular) shape. Tensioning on the tensioning element 102 will pull the wedge-shaped portions 86 toward the center of the anchor plate portion 104. Note that the delivery catheter 122 may be elongated and flexible so as to follow the turns of internal blood vessels, such as femoral arteries and the aorta.

Figure 8A:
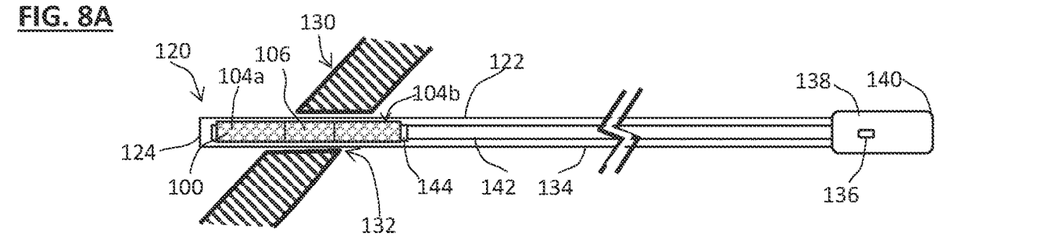
FIGS. 8A-8C depict front views in partial cross-section of a system of the invention deploying an anchor in a heart wall.
Figure 8B:
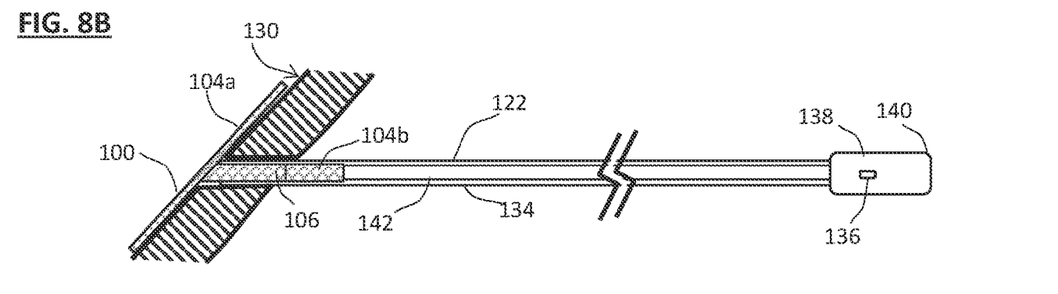

FIGS. 8A-8C depict details of device delivery according to an embodiment of the invention. The system 120 is shown with the catheter distal end 124 and anchor 100 advanced into a patient to a desired treatment site, which in the embodiment depicted is a heart wall 130 with a passage 132 therethrough. With the anchor 100 positioned with the restrained distal plate portion 104a on a distal side of the heart wall 130, the catheter sheath 134 is retracted to expose the distal plate portion 104a and permits expansion thereof, as depicted in FIG. 8B. Retraction of the sheath 134 may be accomplished by a user's activation of controls 136 positioned on the catheter handle 138 at the catheter proximal end 140, which may be positioned outside of the patient during the procedure for easy access by a surgeon or other user. The catheter 122 may include an internal rod 142 or other structure which prevents the anchor 100 from retracting as the sheath 134 is withdrawn. Alternatively, instead of retracting the sheath 134, the rod 142 can be advanced distally, thereby pushing the anchor portions out of the sheath 134. In either case, it is retraction of the sheath 134 with respect to the inner rod 142 which releases the anchor 100 from the sheath 134

Figure 8C:
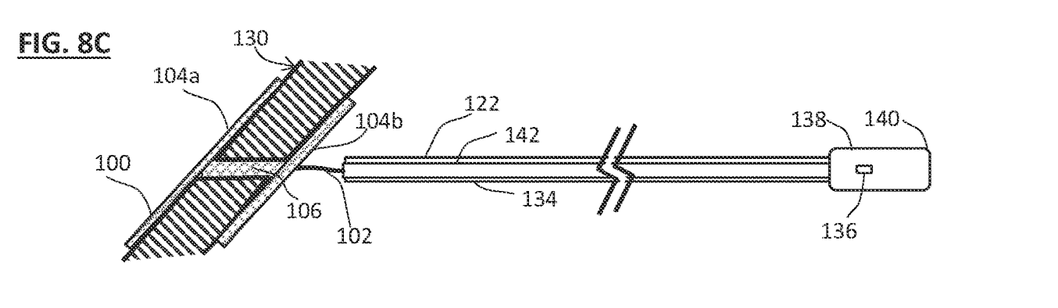

Note that the catheter 122 may include a radially expandable balloon 144 or other expansion mechanism for deploying one or more portions of the anchor 100. Such a balloon 144 may be used to expand a non-memory (non-self-expanding) anchor portion (such as one with a frame portion made from stainless steel), and/or to enhance/facilitate the expansion of a self-expanding anchor portion (such as one with a frame portion made from a memory material such as Nitinol).

Further retraction of the sheath 134 release the entire anchor 100, as depicted in FIG. 8C. At this point, the bridge portion 106 as well as the distal and proximal plate portions 104a, 104b are released and expanded. The tensioning element 102 trails from the anchor 100 and into the delivery catheter 122. Applying tension to the tensioning element 102 will draw the distal and proximal plate portions 104a, 104b together to seat the anchor in the heart wall 130, and may also pull the cover portions of each plate portion 104a, 104b toward the center of the respective plate portion 104a, 104b. As the distal and proximal plate portions 104a, 104b are drawn together, the bridge portion 106 may radially expand, which can improve the sealing ability of the anchor 100.

With the anchor 100 properly positioned and with the tensioning element properly tensioned, the tensioning element 102 can be tied off (e.g., knotted to the anchor by the user) and excess proximal portions of the tensioning element can be removed (i.e., those tensioning element portions which are proximal to the user-applied knot). The catheter 122 can be removed from the patient, and one or more or all openings through which the catheter had been advanced to the heart wall may be closed (such as via suturing).

The deployed anchor can be used to secure one or more tethering and/or other elements (which may be secured to the anchor prior to anchor deployment, during anchor deployment, and/or after anchor deployment). Additionally or alternatively, the anchor can be used to seal the opening in the body structure, such as sealing a hole in a heart wall to prevent the leakage of blood therethrough.

Devices of the invention may include other features to assist in deployment and operation of the devices. For example, radiopaque markers may be included at various locations along devices according to the invention. Active features may be included, such as electrical features.

Various approaches for treatments, including advancing the catheters into position via the sheath, are within the scope of the invention. In one example of a procedure to treat a blood vessel according to the invention, artery access is obtained such as via an access sheath dimensioned for use in such procedures. An incision is created in the patient, leading to an internal blood vessel such as a femoral artery. The distal end of the access sheath is advanced through the incision and internal blood vessel and into through the desired tissue structure such as a heart wall, with the catheter handle positioned outside the patient adjacent the incision/access site. Echo and/or fluoroscopic and/or other visualization techniques may be used to confirm proper position of the device. The treatment and/or implant deployment can occur, such as by deploying the stent at the target location. Once the proper deployment is confirmed, the catheter can be removed from the patient, and the incision(s) closed, such as via sutures.

Note that each element of each embodiment and its respective elements disclosed herein can be used with any other embodiment and its respective elements disclosed herein.

All dimensions listed are by way of example, and devices according to the invention may have dimensions outside those specific values and ranges. The dimensions and shape of the device and its elements depend on the particular application.

Unless otherwise noted, all technical and scientific terms used herein have the same meaning as commonly understood by one of ordinary skill in the art to which this disclosure belongs. In order to facilitate review of the various embodiments of the disclosure, the following explanation of terms is provided:

The singular terms "a", "an", and "the" include plural referents unless context clearly indicates otherwise. The term "or" refers to a single element of stated alternative elements or a combination of two or more elements, unless context clearly indicates otherwise.

The term "includes" means "comprises." For example, a device that includes or comprises A and B contains A and B, but may optionally contain C or other components other than A and B. Moreover, a device that includes or comprises A or B may contain A or B or A and B, and optionally one or more other components, such as C.

The term "subject" refers to both human and other animal subjects. In certain embodiments, the subject is a human or other mammal, such as a primate, cat, dog, cow, horse, rodent, sheep, goat, or pig. In a particular example, the subject is a human patient.

Although methods and materials similar or equivalent to those described herein can be used in the practice or testing of the present disclosure, suitable methods and materials are described below. In case of conflict, the present specification, including terms, will control. In addition, the materials, methods, and examples are illustrative only and not intended to be limiting.

In view of the many possible embodiments to which the principles of the disclosed invention may be applied, it should be recognized that the illustrated embodiments are only examples of the invention and should not be taken as limiting the scope of the invention. Rather, the scope of the invention is defined by the following claims. We therefore claim as our invention all that comes within the scope and spirit of these claims.

What is claimed is:

1. An anchor device for anchoring into a body structure, the anchor device including a deployed configuration and a delivery configuration, the anchor device comprising:
   a distal plate portion comprising a distal frame and a distal covering, wherein the distal plate portion has a distal plate expanded configuration wherein the distal frame forms a substantially flat disk, and a distal plate compressed configuration wherein the distal frame forms an elongated shape adapted to be inserted into a sheath of a delivery catheter;
   a proximal plate portion comprising a proximal frame and a proximal covering, wherein the proximal plate portion has a proximal plate expanded configuration wherein the proximal frame forms a substantially flat disk, and a proximal plate compressed configuration wherein the proximal frame forms an elongated shape adapted to be inserted into a sheath of a delivery catheter; and
   an elongate bridge portion extending between and connecting the distal plate portion and the proximal plate portion, wherein the elongate bridge portion comprises a bridge compressed configuration and a bridge expanded configuration, wherein in the bridge expanded configuration the elongate bridge portion comprises a substantially tubular covering defining a bridge lumen therethrough;
   a tensioning line extending between the distal plate portion and the proximal plate portion, the tensioning line comprising a line distal end secured to the proximal plate portion, the tensioning line passing from the line distal end, then through the bridge lumen, then through the distal plate portion, then back through the bridge lumen, wherein pulling on the tensioning line urges each of the distal plate portion and proximal plate portion toward its respective expanded configurations while also pulling the distal plate portion and proximal plate portion toward each other, thereby urging the anchor device to its deployed configuration;
   wherein when the anchor device is in the deployed configuration, the distal plate portion is in the distal plate expanded configuration, the proximal plate portion is in the proximal plate expanded configuration, and the elongate bridge portion is in the bridge expanded configuration.

2. The anchor device of claim 1, wherein the distal frame and the proximal frame each comprise a ring of memory metal.

3. The anchor device of claim 1, wherein the distal frame comprises a distal frame first end, a distal frame second end, and a distal frame ring portion extending between the distal frame first end and the distal frame second end, wherein in the distal plate expanded configuration the distal frame ring portion forms a ring-shaped perimeter.

4. The anchor device of claim 3, wherein the proximal frame comprises a proximal frame first end, a proximal frame second end, and a proximal frame ring portion extending between the proximal frame first end and the proximal frame second end, wherein in the proximal plate expanded configuration the proximal frame ring portion matches in shape and size to the distal frame ring portion in the distal plate expanded configuration.

5. The anchor device of claim 3, wherein in the distal plate expanded configuration the distal frame first end and the distal frame second end overlap each other, and wherein in the distal plate compressed configuration the distal frame ring portion forms an elongated shape with the distal frame first end and the distal frame second end on opposing ends of the elongated shape.

6. The anchor device of claim 3, wherein in the distal plate expanded configuration the distal frame first end and the distal frame second end are positioned adjacent each other without overlapping, and wherein in the distal plate compressed configuration the distal frame ring portion forms an elongated shape with the distal frame first end and the distal frame second end on opposing ends of the elongated shape.

7. The anchor device of claim 6, wherein the distal frame first end and the distal frame second end each comprise an atraumatic structure adapted to minimize damage to tissue when the atraumatic structure engages tissue.

8. The anchor device of claim 1, wherein the proximal frame and the distal frame are each formed from memory material biased toward the respective expanded configuration.

9. The anchor device of claim 1, wherein the distal covering comprises a distal portion outer channel extending around a perimeter of the distal plate portion, wherein the distal frame passes through the distal portion outer channel, and wherein the proximal covering comprises a proximal portion outer channel extending around a perimeter of the proximal plate portion, wherein the proximal frame passes through the proximal portion outer channel.

10. The anchor device of claim 9, wherein the distal covering comprises a distal portion inner channel extending around the distal covering adjacent the bridge lumen, and wherein the proximal covering comprises a proximal portion inner channel extending around the proximal covering adjacent the bridge lumen, wherein the tensioning line passes through the distal portion inner channel and through the proximal portion inner channel.

11. The anchor device of claim 10, wherein in the distal plate expanded configuration the distal covering comprises a series of wedge-shaped portions extending inwardly from the distal frame, wherein each wedge-shaped portion comprises a loop, and the loops of adjacent wedge-shaped portions align to form the distal portion inner channel.

12. The anchor device of claim 1, wherein the anchor device in the deployed configuration is sized and shaped for the distal plate portion to be compressing against a first side of a flexible tissue wall, with the proximal plate portion compressing against an opposing side of the flexible tissue wall, and the elongate bridge portion extending through and sealing an opening in the flexible tissue wall.

13. The anchor device of claim 12, wherein the distal frame and proximal frame are self-expanding.

14. A system for reshaping a heart chamber, comprising:
   a first anchor device including a deployed configuration and a delivery configuration, the first anchor device adapted for deployment in heart tissue and comprising:

a distal plate portion comprising a distal frame and a distal covering, wherein the distal plate portion has a distal plate expanded configuration wherein the distal frame forms a substantially flat disk, and a distal plate compressed configuration wherein the distal frame forms an elongated shape adapted to be inserted into a sheath of a delivery catheter;

a proximal plate portion comprising a proximal frame and a proximal covering, wherein the proximal plate portion has a proximal plate expanded configuration wherein the proximal frame forms a substantially flat disk, and a proximal plate compressed configuration wherein the proximal frame forms an elongated shape adapted to be inserted into a sheath of a delivery catheter; and a bridge portion extending between and connecting the distal plate portion and the proximal plate portion, wherein the bridge portion comprises a bridge compressed configuration and a bridge expanded configuration, wherein in the bridge expanded configuration the bridge portion comprises a substantially tubular covering defining a bridge lumen therethrough;

a tensioning line extending between the distal plate portion and the proximal plate portion, the tensioning line comprising a line distal end secured to the proximal plate portion, the tensioning line passing from the line distal end, then through the bridge lumen, then through the distal plate portion, then back through the bridge lumen, then back through the proximal plate portion, wherein pulling on the tensioning line pulls the distal plate portion and proximal plate portion towards each other and urges the first anchor device toward its deployed configuration;

wherein when the first anchor device is in the deployed configuration, the distal plate portion is in the distal plate expanded configuration, the proximal plate portion is in the proximal plate expanded configuration, and the bridge portion is in the bridge expanded configuration, and wherein the first anchor device in the deployed configuration is sized and shaped to compress at least one tissue layer between the distal plate portion and the proximal plate portion; a delivery catheter comprising:

a catheter distal portion adapted to receive and releasably hold the first anchor device in the delivery configuration;

a catheter proximal portion comprising a control handle having one or more controls thereon; and an elongated body portion extending between the catheter distal portion and the catheter proximal portion;

a second anchor device including a delivery configuration and a deployed configuration and adapted for deployment in heart tissue; and a tether adapted to couple the first anchor device to the second anchor device and to pull the first anchor device and second anchor device toward each other to thereby reshape the heart chamber of a heart in which the first anchor device and second device have been deployed.

15. The system of claim 14, wherein the catheter distal portion comprises an expansion balloon adapted to radially expand at least a portion of the first anchor device.

16. The system of claim 14, wherein the first anchor device is self-expanding, wherein the catheter distal portion comprises a sheath adapted to slidingly receive the first anchor device therein in the delivery configuration.

17. The system of claim 16, wherein the distal frame comprises a distal frame first end, a distal frame second end, and a distal frame ring portion extending between the distal frame first end and the distal frame second end, wherein in the distal plate expanded configuration the distal frame ring portion forms a ring-shaped perimeter, and wherein the first anchor device is secured within the sheath with the distal frame first end distal of the distal frame ring portion, and with the distal frame second end proximal of the distal frame ring portion.

18. The system of claim 17, wherein the proximal frame comprises a proximal frame first end, a proximal frame second end, and a proximal frame ring portion extending between the proximal frame first end and the proximal frame second end, wherein in the proximal plate expanded configuration the proximal frame ring portion forms a ring-shaped perimeter, and wherein the first anchor device is secured within the sheath with the proximal frame first end distal of the proximal frame ring portion, and with the proximal frame second end proximal of the proximal frame ring portion.

19. The system of claim 18, wherein the first anchor device is secured within the sheath with the distal plate portion distal of the bridge portion, and with the proximal plate portion proximal of the bridge portion.

20. The system of claim 18, wherein the catheter is adapted to advance the first anchor device out of the sheath with the distal frame first end advancing out of the sheath first, followed by the distal frame second end, followed by the bridge portion, followed by the proximal frame first end, followed by the proximal frame second end.

21. The system of claim 14, the tensioning line further comprising a proximal line portion extending from the first anchor device to the control handle, wherein the proximal line portion is adapted to be pulled by a user to selectively pull the distal plate portion toward the proximal plate portion.

22. The system of claim 21, wherein the distal covering comprises a distal portion inner channel extending around the distal covering adjacent the bridge lumen, and wherein the proximal covering comprises a proximal portion inner channel extending around the proximal covering adjacent the bridge lumen, wherein the tensioning line extends from the line distal end, then through the proximal portion inner channel, then through the bridge lumen, then through the distal portion inner channel, then back through the bridge lumen, then through the proximal plate portion, then to the control handle.

23. The system of claim 14, wherein the second anchor device comprises:

a second distal plate portion comprising a second distal frame and a second distal covering, wherein the second distal plate portion has a second distal plate expanded configuration wherein the second distal frame forms a substantially flat disk, and a second distal plate delivery configuration wherein the second distal frame forms an elongated shape;

a second proximal plate portion comprising a second proximal frame and a second proximal covering, wherein the second proximal plate portion has a second proximal plate expanded configuration wherein the second proximal frame forms a substantially flat disk, and a second proximal plate delivery configuration wherein the second proximal frame forms an elongated shape; and a second bridge portion extending between and connecting the second distal plate portion and the second proximal plate portion, wherein the second bridge portion comprises a second bridge compressed configuration and a second bridge expanded configuration, wherein in the second bridge expanded configuration the second bridge portion comprises a second substantially tubular covering defining a second bridge lumen therethrough.

24. An anchor device for anchoring into a body structure, the anchor device having a deployed configuration and a delivery configuration, the anchor device comprising:
 a distal plate portion comprising a distal frame and a distal covering, wherein the distal plate portion comprises a distal plate expanded configuration wherein the distal frame forms a disk and the distal plate portion comprises a distal plate proximal-facing tissue-engaging surface, and the distal plate portion further comprises a distal plate compressed configuration wherein the distal frame forms an elongate shape adapted for transcatheter delivery;
 a proximal plate portion comprising a proximal frame and a proximal covering, wherein the proximal plate portion comprises a proximal plate expanded configuration wherein the proximal frame forms a disk and the proximal plate portion comprises a proximal plate distal-facing tissue-engaging surface, and the proximal plate portion further comprises a proximal plate compressed configuration wherein the proximal frame forms an elongate shape adapted for transcatheter delivery;
 a bridge portion extending between and connecting the distal plate portion and the proximal plate portion, wherein the bridge portion comprises a bridge compressed configuration and a bridge expanded configuration, wherein in the bridge expanded configuration the bridge portion comprises a substantially tubular covering defining a bridge lumen therethrough; and
 a tensioning assembly adapted to urge the distal plate portion and proximal plate portion toward their respective expanded configurations, the tensioning assembly also adapted to draw the distal plate portion toward the proximal plate portion, the tensioning assembly comprising a tensioning line comprising a line distal end secured to the proximal plate portion, the tensioning line passing from the line distal end, then through the bridge lumen, then through the distal plate portion, then back through the bridge lumen, then back through the proximal plate portion;
 wherein pulling on the tensioning line urges the distal plate portion and proximal plate portion toward their respective expanded configurations while also controlling compression between the proximal plate portion and the distal plate portion;
 wherein when the anchor device is in the deployed configuration, the distal plate portion is in the distal plate expanded configuration, the proximal plate portion is in the proximal plate expanded configuration, and the bridge portion is in the bridge expanded configuration.

25. The anchor device of claim 24, wherein the bridge portion is adapted to radially expand responsive to the tensioning assembly drawing the distal plate portion toward the proximal plate portion.

26. The anchor device of claim 24, wherein the tensioning line comprises a proximal line portion adapted to be pulled by a user to selectively draw the distal plate portion toward the proximal plate portion.

27. The anchor device of claim 24, wherein the distal covering comprises a distal portion outer channel extending around a perimeter of the distal plate portion, wherein the distal frame passes through the distal portion outer channel, and wherein the proximal covering comprises a proximal portion outer channel extending around a perimeter of the proximal plate portion, wherein the proximal frame passes through the proximal portion outer channel.

28. The anchor device of claim 27, wherein:
 the distal covering comprises a distal portion inner channel, wherein with the distal plate portion in the distal plate expanded configuration the distal portion inner channel is positioned radially within the distal portion outer channel;
 wherein the proximal covering comprises a proximal portion inner channel, wherein with the proximal plate portion in the proximal plate expanded configuration the proximal portion inner channel is positioned radially within the proximal portion outer channel; and
 wherein the tensioning line passes through the distal portion inner channel and the proximal portion inner channel, and after passing through the distal portion inner channel the tensioning line passes back through the bridge portion and through the proximal plate portion.

29. The anchor device of claim 28, wherein:
 the distal covering comprises a plurality of distal covering wedge-shaped portions, wherein each distal covering wedge-shaped portion comprises a distal covering wedge-shaped loop, wherein the distal covering wedge-shaped loops are adapted to align to form the distal portion inner channel; and
 the proximal covering comprises a plurality of proximal covering wedge-shaped portions, wherein each proximal covering wedge-shaped portion comprises a proximal covering wedge-shaped loop, wherein the proximal covering wedge-shaped loops are adapted to align to form the proximal portion inner channel.

30. The anchor device of claim 24, wherein the tensioning assembly is adapted to hold the bridge portion in the bridge expanded configuration, and wherein the bridge portion is adapted to radially expand responsive to the tensioning assembly drawing the distal plate portion toward the proximal plate portion and further adapted to seal a tissue opening through which the bridge portion is deployed.

31. The anchor device of claim 30, wherein the substantially tubular covering of the bridge portion comprises a piece of biocompatible cloth.

32. The anchor device of claim 24, wherein the proximal covering, the substantially tubular covering, and the distal covering comprise a strip of biocompatible cloth, wherein the strip of cloth is folded over the proximal frame and also folded over the distal frame.

33. The anchor device of claim 24, wherein the anchor device in the deployed configuration is sized and shaped for the distal plate portion to be positioned against a first side of a heart wall, with the proximal plate portion positioned against an opposing side of the heart wall, and the bridge portion extending through and sealing an opening in the heart wall.

* * * * *